United States Patent [19]
Merkel

[11] Patent Number: 5,146,884
[45] Date of Patent: Sep. 15, 1992

[54] ENGINE WITH AN OFFSET CRANKSHAFT

[76] Inventor: Ronald F. Merkel, 2010 Yorktown Ct. S., League City, Tex. 77573

[21] Appl. No.: 617,671

[22] Filed: Nov. 26, 1990

[51] Int. Cl.⁵ .................... F02B 75/04; F02B 75/32
[52] U.S. Cl. ............................ 123/197.4; 123/48 B
[58] Field of Search ......... 123/197 AL, 51 R, 51 BB, 123/48 B, 56 AA, 56 AB, 56 BB, 197.4

[56] References Cited

U.S. PATENT DOCUMENTS

| | | | |
|---|---|---|---|
| 1,091,629 | 3/1914 | Campbell | 123/51 BB |
| 1,474,549 | 11/1923 | Penning | 123/51 BB |
| 1,886,455 | 11/1932 | Thonger | 123/195 AC |
| 1,890,794 | 12/1932 | Penning | 123/51 BB |
| 2,079,156 | 3/1937 | Danckwortt | 123/51 BB |
| 2,137,941 | 11/1938 | Helmore et al. | 123/56 AB |
| 2,730,087 | 1/1956 | Morton et al. | 123/51 BB |
| 2,914,045 | 11/1959 | Hill | 123/56 AA |
| 3,021,825 | 2/1962 | La Para | 123/51 R |
| 3,945,358 | 3/1976 | Collins | 123/56 AA |
| 4,738,230 | 4/1988 | Johnson | 123/48 B |
| 4,974,554 | 12/1990 | Emery | 123/48 B |

Primary Examiner—Raymond A. Nelli
Attorney, Agent, or Firm—Neal J. Mosely

[57] ABSTRACT

A new and useful improvement to internal combustion engines is disclosed which is an engine with an offset crankshaft. When the crankshaft is rotated in a clockwise direction, the distance the piston travels from the top of the stroke (piston at maximum travel) to the bottom of the stroke (piston at the bottom of its travel) is greater than the diameter of the crankshaft rotation. The angle through which the crankshaft moves during the downstroke is greater than 180°. The engine therefore has a longer time power stroke than exhaust stroke. The intake cycle is longer in time than the exhaust cycle which improves aspiration of the engine. This concept can be applied to Otto cycle engines, Diesel engines, two stroke engines, and may be applied to compressors. When used in compressors, the intake stroke is extended which improves aspiration.

11 Claims, 11 Drawing Sheets

ENGINE WITH AN OFFSET CRANKSHAFT

BACKGROUND OF THE INVENTION

1. Field of the Invention

This invention relates generally to internal combustion engines, and more particularly to an engine with an offset crankshaft.

2. Brief Description of the Prior Art

The internal combustion engine is well known in the prior art. Examples of prior art references are Campbell U.S. Pat. No. 1,091,629; Pulman U.S. Pat. No. 1,201,098; Penning U.S. Pat. No. 1,317,939; Swensen U.S. Pat. No. 2,236,738; and Sanchez Great Britain Pat. No. 24,568.

Campbell U.S. Pat. No. 1,091,629 discloses a four cycle engine using two pistons in the same cylinder, connected with the crank shaft by an improved system of rods and rockarms or cranks having a small number of parts adapted to efficiently transmit the forces to which they are subjected, whereby one piston effects the suction of the charge at a relatively slow rate, and the scavenging of the cylinder, the other piston serving to compress the charge at a relatively rapid rate and execute the power stroke. The objective of this arrangement of crankshafts is to allow for driving the two pistons in opposition and provide a stroke of the pistons for every 360° revolution of the crankshaft. The power stroke is no more than 90 of rotation of the crankshaft.

Pulman U.S. Pat. No. 1,201,098 discloses an engine of the kind or class in which the working pressure is exerted between two pistons moving in opposite directions in the working cylinder, and operating a single crank. This Patent claimed the combination of two oppositely-moving pistons, a single cross-head operated by the joint action of said two pistons, and moving in the same direction as one of the pistons, and a crank driven from such cross-head and common to the two pistons, in an internal-combustion engine.

Penning U.S. Pat. No. 1,317,939 discloses a combustion engine wherein the cylinders are arranged in pairs, each cylinder having two pistons, between which the explosion occurs, the movement of the pistons being transmitted to a single crank shaft by means of rockers and connecting rods. The power stroke is no more than 180° in this engine. The object of this invention was to provide improvements more especially applicable to two cycle engines, and also various improvements in details of construction and oiling, whether of the type employing carburetors for forming the explosive charge, or of the Diesel or semi-Diesel types.

Swensen U.S. Pat. No. 2,236,738 discloses a novel power transmission mechanism whereby the reciprocating movement of the cylinder-and-piston engine will be converted into rotary motion, or conversely, rotary motion of the power-driven shaft may be converted into reciprocating movement in a cylinder-and-piston machine, such as a pump or air compressor. The power stroke is no more than 180° in this engine. That invention may be employed in connection with a single cylinder-and-piston engine or in connection with a multi-cylinder-and-piston engine. However, the preferred embodiment employed a plurality of such engines in connection with a rotary shaft having a plurality of oblique cranks set in such a way that the endwise thrust on the rotary shaft will be neutralized.

Sanchez Great Britain Pat. No. 24,568 discloses an engine of the rotary type in which the cylinders are arranged in the form of a star, such as were intended for aviation in 1914. The invention is a sleeve-valve engine. The power stroke is no more than 180° in this engine.

The present invention is distinguished over the prior art in general, and these patents in particular, by a new and useful improvement to internal combustion engines which is an engine with an offset crankshaft. When the crankshaft is rotated in a clockwise direction, the distance the piston travels from the top of the stroke (piston at maximum travel) to the bottom of the stroke (piston at the bottom of its travel) is greater than the diameter of the crankshaft rotation. The angle through which the crankshaft moves during the downstroke is greater than 180°. The engine therefore has a longer time power stroke than exhaust stroke. The intake cycle is longer in time than the exhaust cycle which improves aspiration of the engine. This concept can be applied to Otto cycle engines, Diesel engines, two stroke engines, and may be applied to compressors. When used in compressors, the intake stroke is extended which improves aspiration.

SUMMARY OF THE INVENTION

It is therefore an object of the present invention to provide an engine with an offset crankshaft.

It is another object of this invention to provide an engine having a downstroke longer than the downstroke in a standard engine for an equal diameter crankshaft.

Another object of this invention is to provide an engine in which the crankshaft moves through an angle greater than 180° during the downstroke.

Another object of this invention is to provide an engine in which the power stroke is longer in time than the compression stroke.

Another object of this invention is to provide an engine in which the intake stroke is longer in time than the exhaust stroke.

A further object of this invention is to provide an engine having improved aspiration.

A still further object of this invention is to provide an engine that applies power through a greater rotation of the crankshaft than a standard engine Other objects of the invention will become apparent from time to time throughout the specification and claims as hereinafter related.

The above noted objects and other objects of the invention are accomplished by a new and useful improvement to internal combustion engines which is an engine with an offset crankshaft. When the crankshaft is rotated in a clockwise direction, the distance the piston travels from the top of the stroke (piston at maximum travel) to the bottom of the stroke (piston at the bottom of its travel) is greater than the diameter of the crankshaft rotation. The angle through which the crankshaft moves during the downstroke is greater than 180°. The engine therefore has a longer time power stroke than exhaust stroke. The intake cycle is longer in time than the exhaust cycle which improves aspiration of the engine. This concept can be applied to Otto cycle engines, Diesel engines, two stroke engines, and may be applied to compressors. When used in compressors, the intake stroke is extended which improves aspiration.

DESCRIPTION OF THE PREFERRED EMBODIMENT

This invention relates to new and useful improvements in internal combustion engines and more particularly to an engine in which the piston is substantially offset from the center line of the crankshaft.

Figure 2:
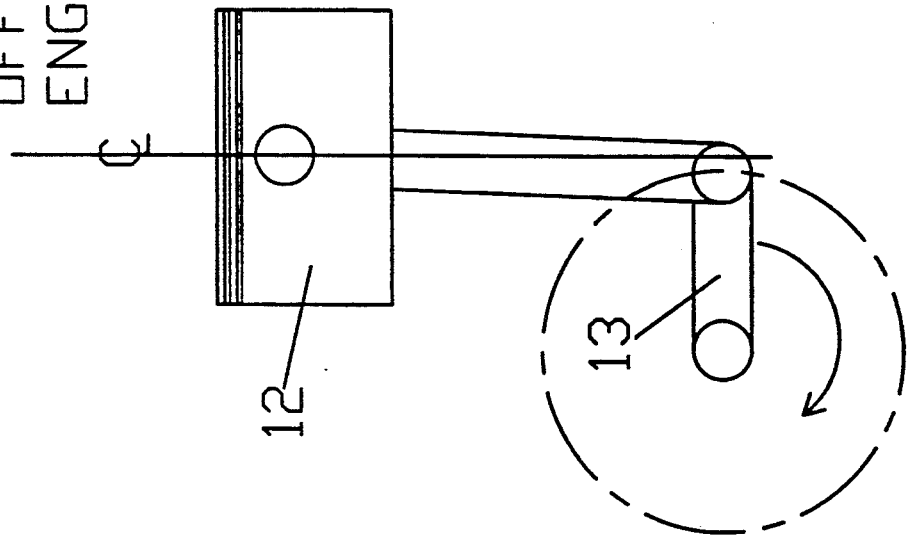
FIG. 2 is a schematic view showing the offset relation of the piston and crankshaft in accordance with the present invention.
Figure 1:
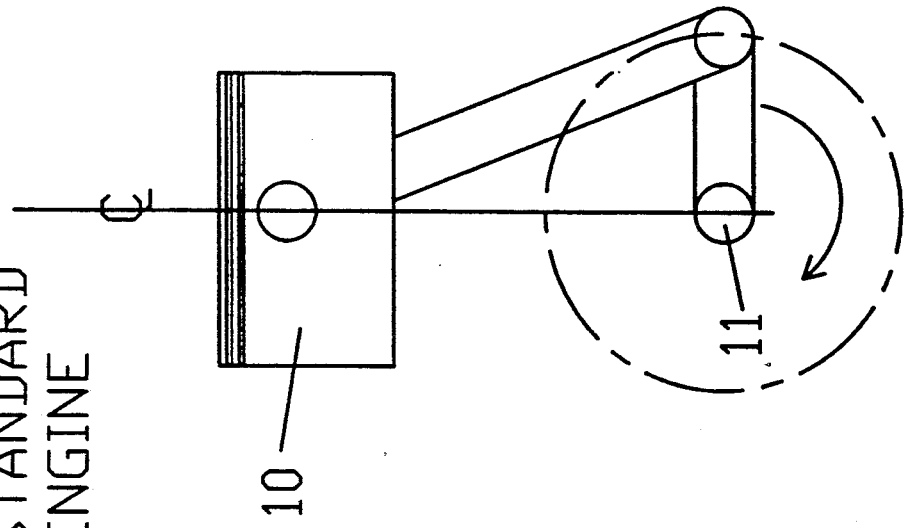
FIG. 1 is a schematic view showing the aligned relation of the piston and crankshaft in a conventional engine.

Referring to the drawings by numerals of reference, in FIG. 1, there is shown a schematic view showing the aligned relation of a piston 10 and crankshaft in a conventional engine. In FIG. 2, there is shown a schematic view showing the offset relation of the piston 12 and crankshaft 13 in accordance with the present invention.

For a standard engine, when the crankshaft 11 is rotated, the time it takes the piston 10 to travel from the top of the stroke to the bottom of the stroke is equal to the time it takes the piston to return from the bottom of the stroke to the top of the stroke. However, in an engine with an offset crank shaft embodying the present invention, when the crankshaft 13 is rotated, the time it takes the piston 12 to travel from the top of the stroke to the bottom of the stroke is greater than the time it takes the piston to return from the bottom of the stroke to the top of the stroke. The distance the piston travels from the top of the stroke (piston at maximum travel) to the bottom of the stroke (piston at the bottom of its travel) is greater than the diameter of the crankshaft rotation The angle through which the crankshaft moves during the downstroke is greater than 180°. The engine therefore has a longer time power stroke than exhaust stroke. The intake cycle is longer in time than the exhaust cycle which improves aspiration of the engine.

In FIGS. 3–7, an engine in which the piston is substantially offset from the center line of the crankshaft is shown in more detail. Internal combustion engine 14 comprises a cylinder 15 with a piston 16 positioned for reciprocal movement therein.

The upper end of cylinder 15 includes a cylinder head portion 17 with an intake port 18 and exhaust port 19. An overhead intake valve 20 cooperates with valve seat 21 and an overhead exhaust valve 22 cooperates with valve seat 23. Overhead valves 20 and 22 are spring loaded to a closed position by springs 24 and 25. Rocker arms 26 and 27 are operated by camshaft 28 to operate valves 20 and 22 in coordination with movement of piston 16. Camshaft block 29 encloses an overhead camshaft 28 and rocker arms 26, 27. The camshaft lobes are spaced 85° or 95° apart in contrast to 90° for a standard engine to accommodate the offset crankshaft timing. The structure so far described, except for the spacing of the camshaft lobes, is conventional internal combustion engine design.

The bottom end of cylinder 15 includes a skirt portion 30 forming the cover for the crankcase 31. A crankshaft 32 is positioned for rotation inside the crankcase 31 with its center line 33 laterally offset from the center line of cylinder 15. The amount of offset is a matter of choice for the engine designer along with other factors such as dimensions of the engine, length of connecting rod, etc. In the embodiment shown, the amount of offset is approximately equal to the length of the crank arm. The portion of cylinder 15 adjacent to crankcase 31 has a slot 36 positioned to accommodate sidewise pivotal movement of connecting rod 34 during movement of piston 16 and crankshaft 32 through a full cycle of operation.

Figure 7:
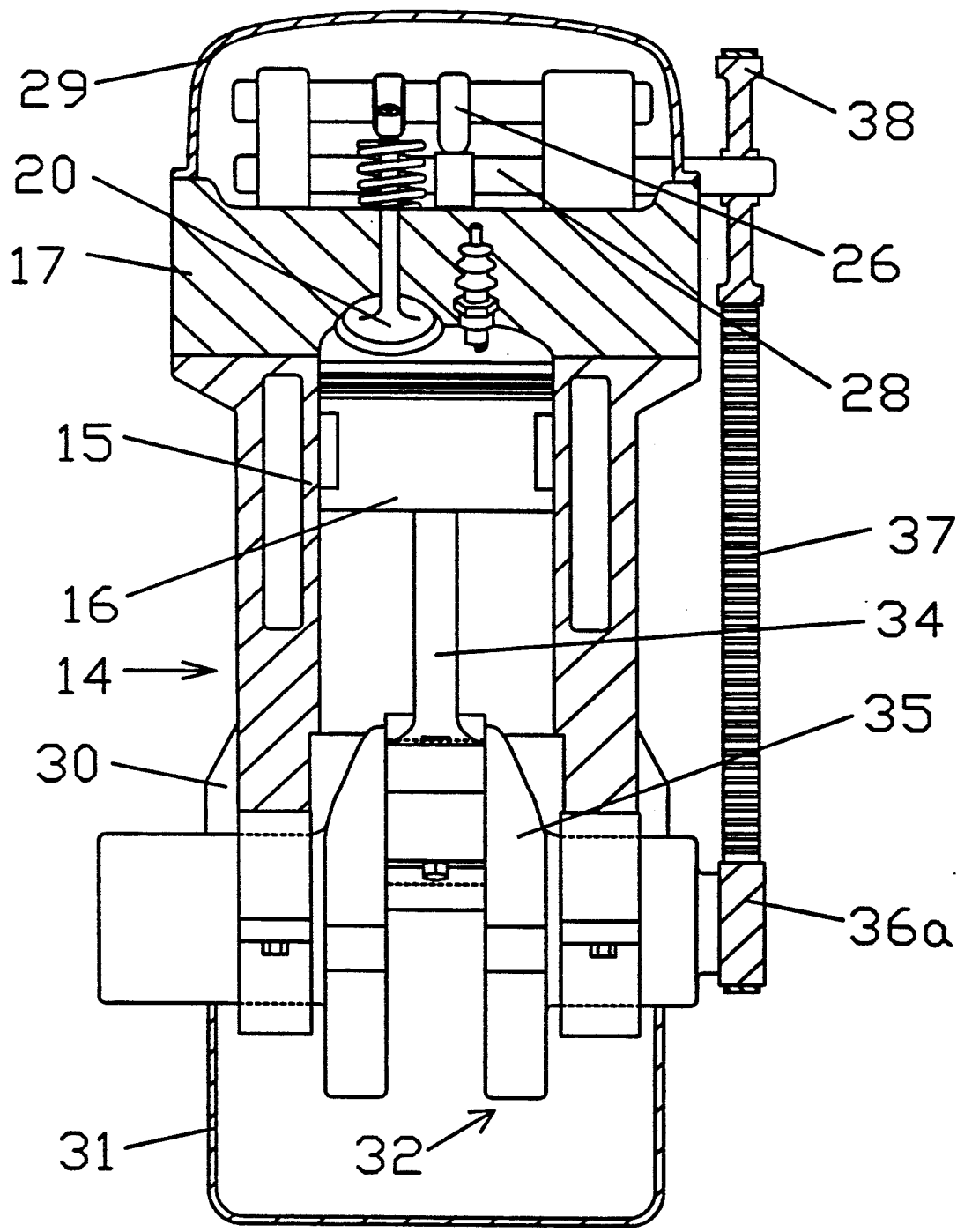
FIG. 7 is a right elevation of an internal combustion engine with an offset crankshaft, as shown in FIGS. 3–6.

In FIG. 7, a right elevation of the engine is shown to illustrate the various connections. Crankshaft 32 has a gear 36a at its outer end connected by a timing belt 37 to gear 38 which operates camshaft 28. The operation of engine 14 is the same as that of conventional engines except for the crankshaft offset and valve timing. The piston 16 reciprocates in cylinder 15 through the conventional intake, compression, power and exhaust strokes. Rotation of crankshaft 32 operates camshaft 28 through timing belt 37 to operate the intake valve 20 and exhaust valve 22 in the proper sequence for the intake, compression, power and exhaust strokes.

This invention is conventional in structure except for the offset relation of the center line of piston 16 and the center line of crankshaft 32. Air inlet to the engine is provided through a carburetor (not shown) and an intake manifold (not shown). Exhaust gases from the engine pass through an exhaust manifold (not shown). The position of the crankshaft 32 in relation to piston 16 and connecting rod 34 is shown for the intake, compression, power and exhaust strokes in FIGS. 3–6 and the operating characteristics of the engine are shown in the graphs comprising FIGS. 8–12.

Figure 3:
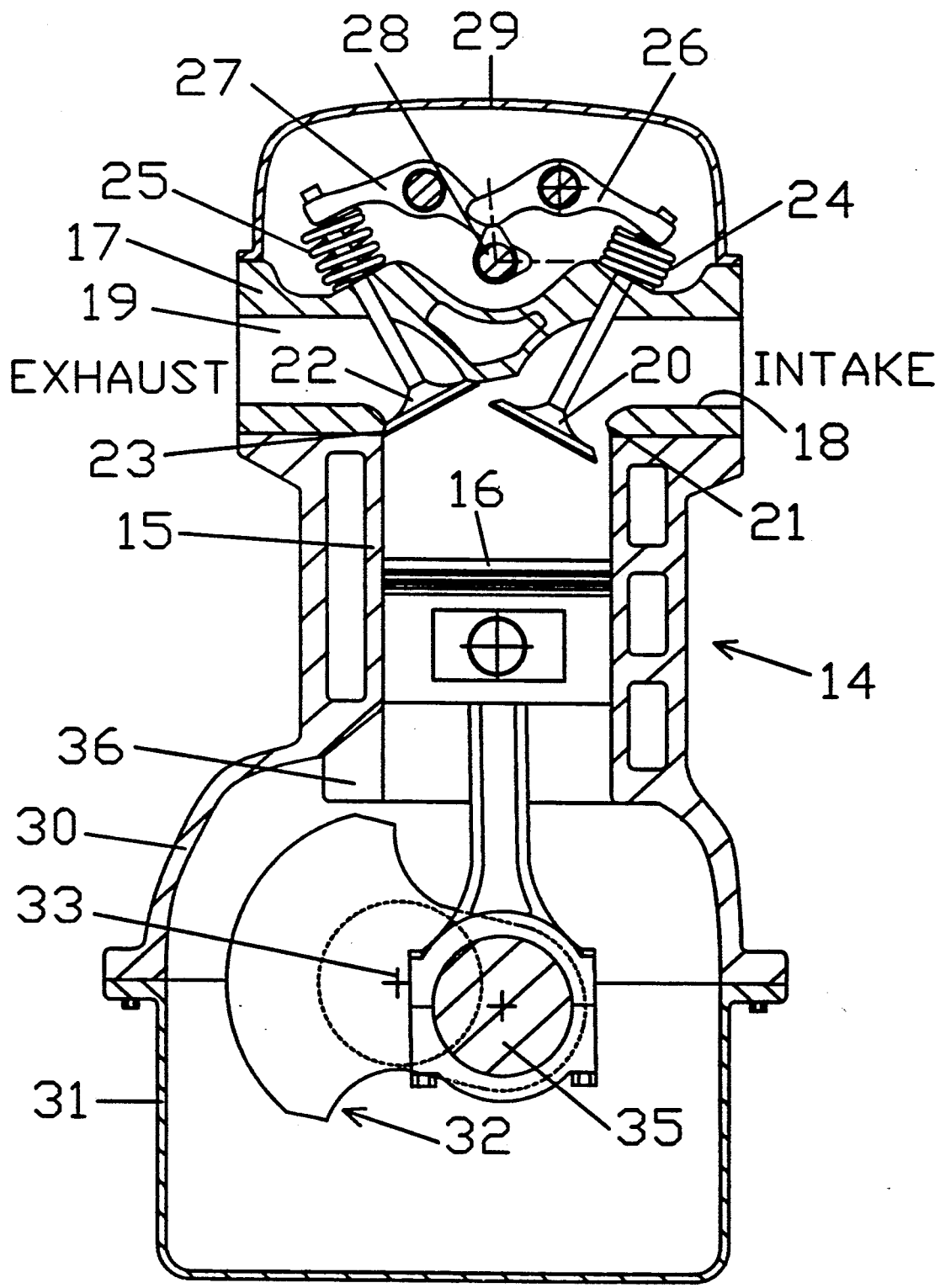
FIG. 3 is a cross-section view of an internal combustion engine with an offset crankshaft, in accordance with the present invention, shown during the intake stroke.

In FIG. 3, the engine 14 with offset crankshaft 32 is shown in the intake stroke. Cylinder 15 is filling with the fuel-air mixture, and the piston 16 is shown in the first downstroke or intake stroke. The connecting rod 34 and crankshaft 32 are shown offset as described above. Exhaust valve 22 is closed and intake valve 20 is open.

Figure 4:
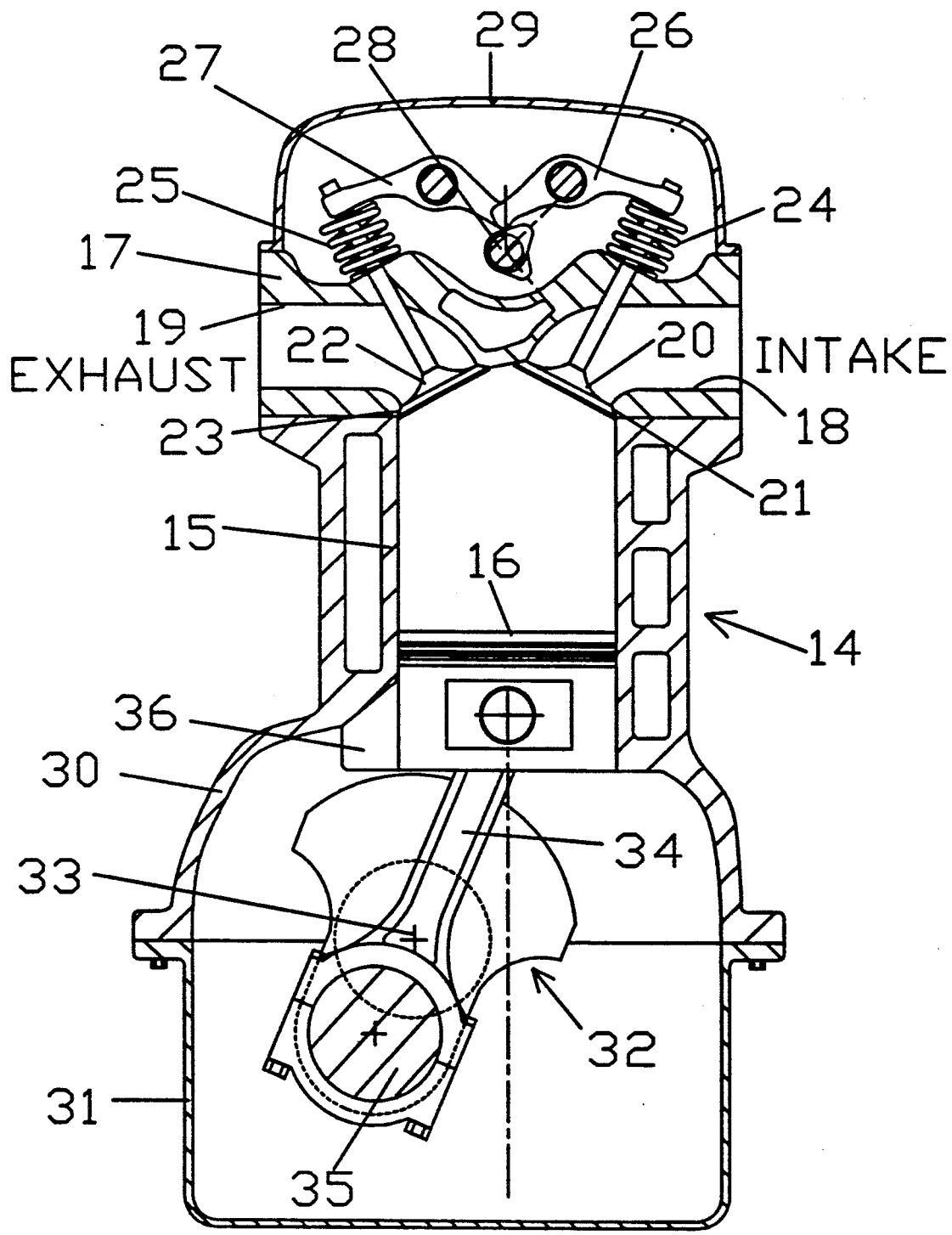
FIG. 4 is a cross-section view of an internal combustion engine with an offset crankshaft, in accordance with the present invention, shown during the compression stroke.

In FIG. 4, the engine 14 with offset crankshaft 32 is shown at the start of the compression stroke. Cylinder 15 is filled with the fuel-air mixture, and the piston 16 is shown in the first upstroke or compression stroke. The connecting rod 34 and crankshaft 32 are shown offset as described above. Both valves 20 and 22 are closed.

Figure 5:
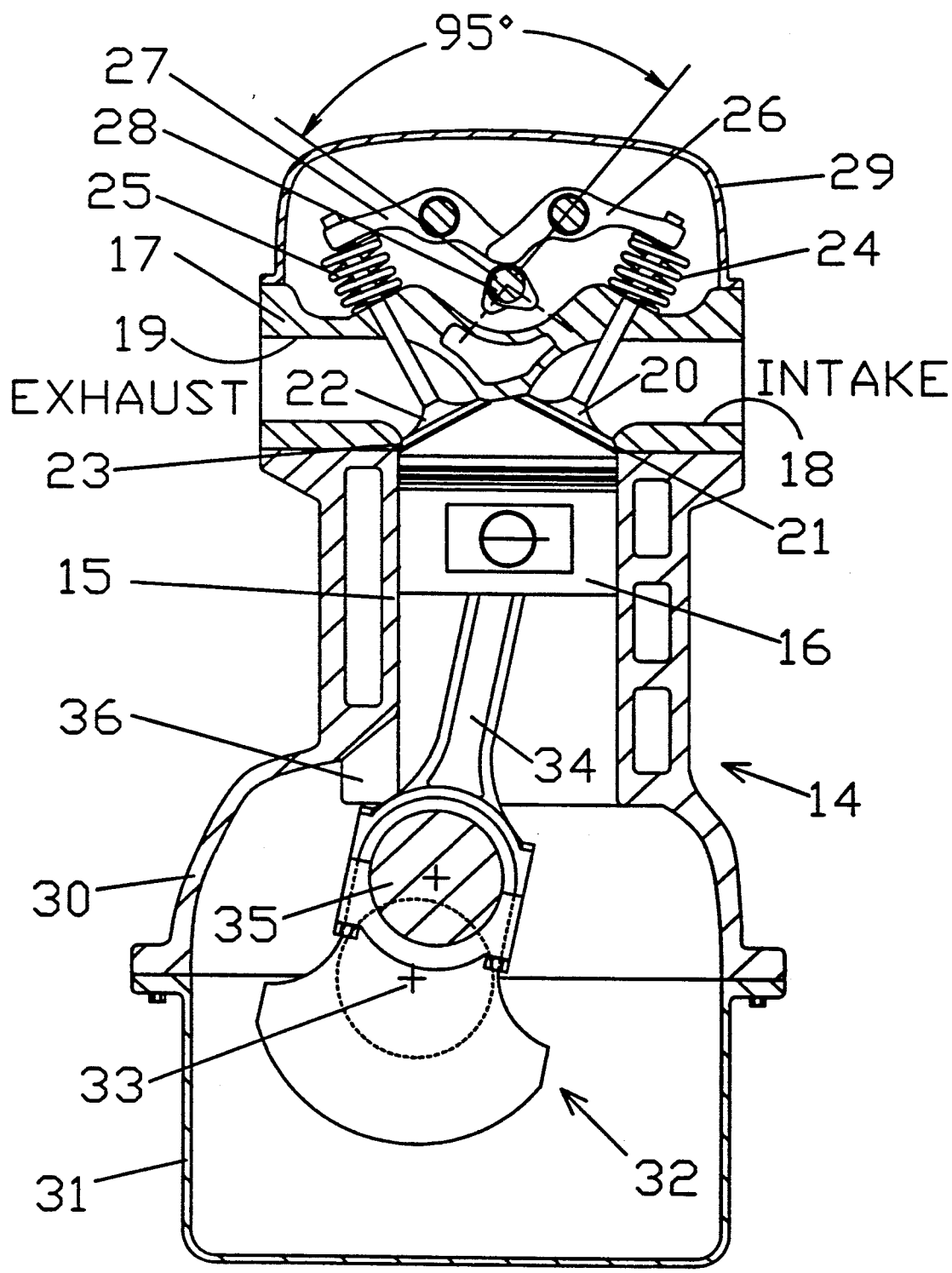
FIG. 5 is a cross-section view of an internal combustion engine with an offset crankshaft, in accordance with the present invention, shown at the beginning of the power stroke.

In FIG. 5, the engine 14 with an offset crankshaft 32 is shown with the cylinder 15 containing the fuel-air mixture at the completion of the compression stroke and start of the power stroke. When the fuel mixture is ignited by a spark from the spark plug, the piston 16 starts to move downward in the second downstroke or power stroke. The connecting rod 34 and crankshaft 32 are shown arranged for the offset position. Both valves 20 and 22 are shown in the closed position. On full movement through the power stroke, the piston reaches the position shown in FIG. 4, and exhaust valve 22 is opened in preparation for the exhaust stroke.

Figure 6:
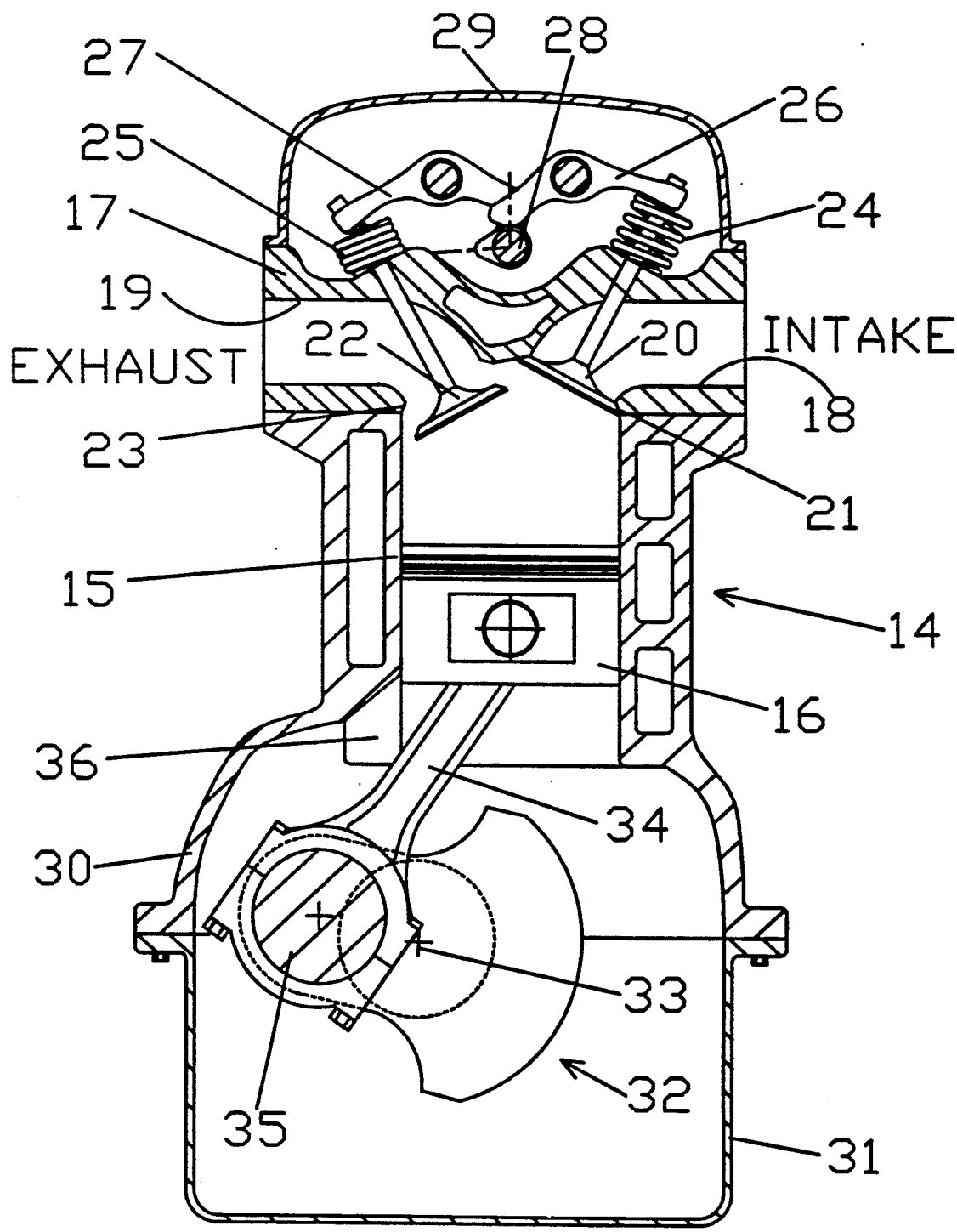
FIG. 6 is a cross-section view of an internal combustion engine with an offset crankshaft, in accordance with the present invention, shown during the exhaust stroke.

In FIG. 6, the engine 14 with an offset crankshaft 32 is shown with the cylinder 15 as the exhaust gases are leaving. The piston 16 is shown in the second upstroke or exhaust stroke. The connecting rod 34 and crankshaft 32 are shown arranged for the offset position. The exhaust valve 22 is shown in the open position.

For starting the engine 14, initial rotation of the crankshaft 32 is provided by a starter motor (not shown). The charge for the electrical system is maintained by a generator (not shown). Fuel is provided to the engine 14 through the carburetor, by a fuel pump (not shown). The fuel is mixed with air, and the mixture is introduced into the cylinder 15 for combustion. Any impurities which may be present in the fuel are removed by a fuel filter (not shown).

The overhead camshaft 28 is rotated through a gear 38 attached at one end which is engaged to a timing belt 37, which is also engaged to, and rotated by, a gear 36 attached at one end of the crankshaft 32. The engine 14 has an ignition system (not shown) which includes spark plugs, spark plug wires, distributor, distributor cap, points, and condenser.

Where contact of metal-to-metal surfaces occurs, sealing is provided by gaskets (not shown) of appropriate material. Shaft deflection of the crankshaft 32 is prevented by the provision of suitable bearings. The engine may be water cooled or air cooled.

OPERATION

The operation of the engine 10 with an offset crankshaft 32 should be obvious from the description of the preferred embodiment, but will be stated herein for clarity.

The operation of the engine 14 with an offset crankshaft 32 is similar to the operation of a standard engine having a four-stroke cycle, or a two-stroke cycle. Combustion occurs in the cylinder 15, in the upper portion, forcing the piston 16 to move downward. The piston downward movement moves the connecting rod 34 downward turning the crankshaft 32.

The rotation of crankshaft 32 and movement of piston 16 is seen in FIGS. 3–6. At the start of the intake stroke, the piston 16 is at the upper end of cylinder 15, as seen in FIG. 5, but with the intake valve 20 open. Piston 16 moves downward, as in FIG. 3, until it reaches the lowest position, as in FIG. 4, but with intake valve 20 still open.

At this point, both valves 20 and 22 are closed, as in FIG. 4, and the piston 16 starts the upstroke for compression and moves to the uppermost position, as in FIG. 5, which is the end of the compression stroke. Ignition then takes place, and piston 16 starts downward from the position of FIG. 5 until it reaches the position of FIG. 4. Exhaust valve 22 then opens and piston 16 moves upward, as in FIG. 6, through the exhaust stroke.

Through this rotation of crankshaft 32 and movement of piston 16, the offset relation of the crankshaft and piston results in the time for piston travel from the top of the stroke to the bottom of the stroke being greater than the time for the piston to return from the bottom of the stroke to the top of the stroke. The distance the piston travels from the top of the stroke (piston at maximum travel) to the bottom of the stroke (piston at the bottom of its travel) is greater than the diameter of the crankshaft rotation. The angle through which the crankshaft moves during the downstroke is greater than 180°. The engine therefore has a longer time power stroke than exhaust stroke. The intake cycle is longer in time than the exhaust cycle which improves aspiration of the engine.

Figure 8:
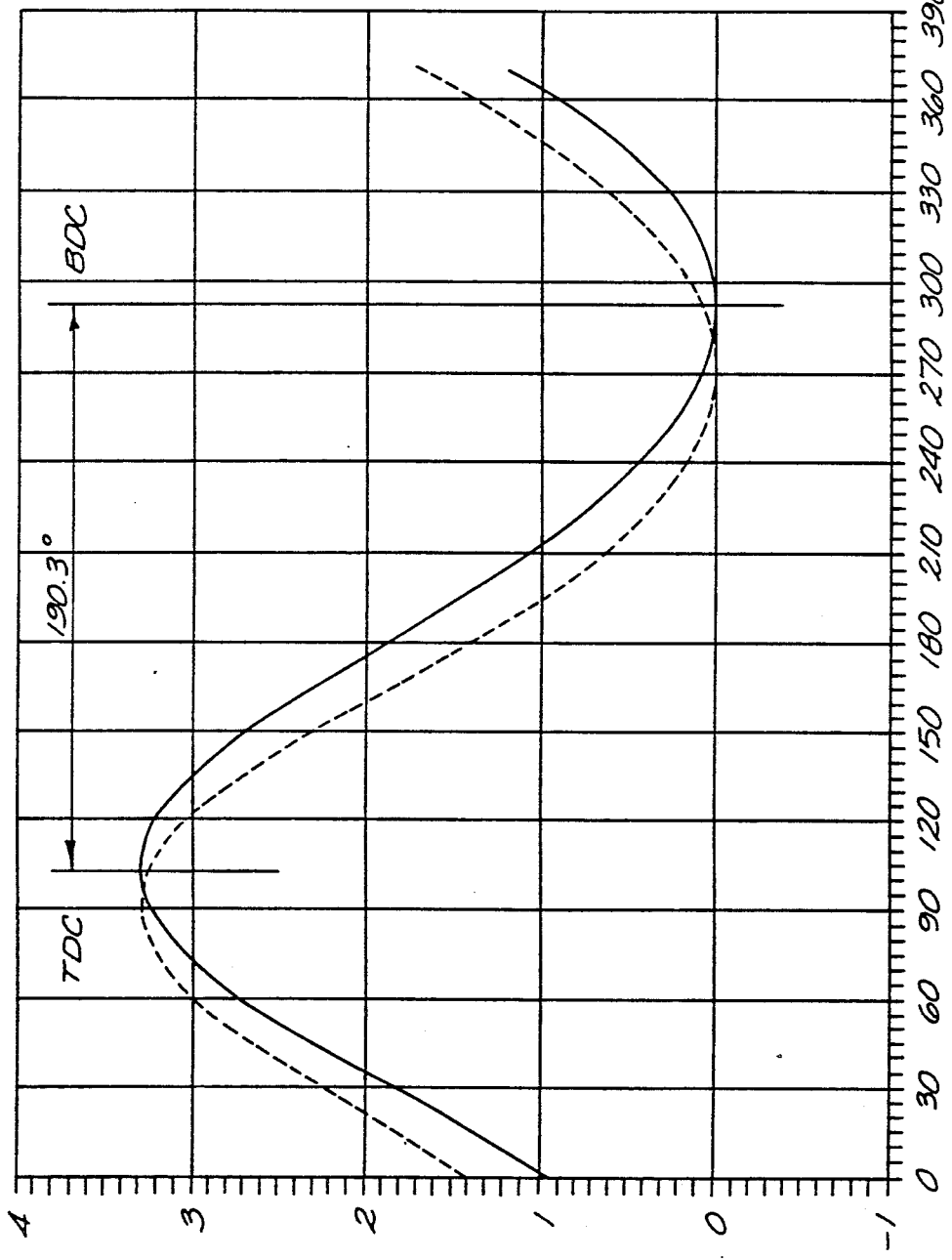
FIG. 8 is a graph of piston position vs. degrees of crankshaft rotation for a conventional engine with aligned piston and crankshaft and an engine with the offset relation of the piston and crankshaft in accordance with the present invention of the arrangement shown in 3–6 where both engines have equal stroke.

FIGS. 8–12 graph the crankshaft rotation against piston position, torque, etc. In FIG. 8, piston position is graphed against crankshaft rotation for an engine with conventional crankshaft and for this invention where the crankshaft is offset. It is seen that the angle of movement of the crankshaft between top and bottom positions of the piston is 180° for the conventional crankshaft arrangement and 190.3° for the offset crankshaft of this invention. This allows a longer time power stroke and intake stroke and a shorter time compression stroke and exhaust stroke.

Figure 9:
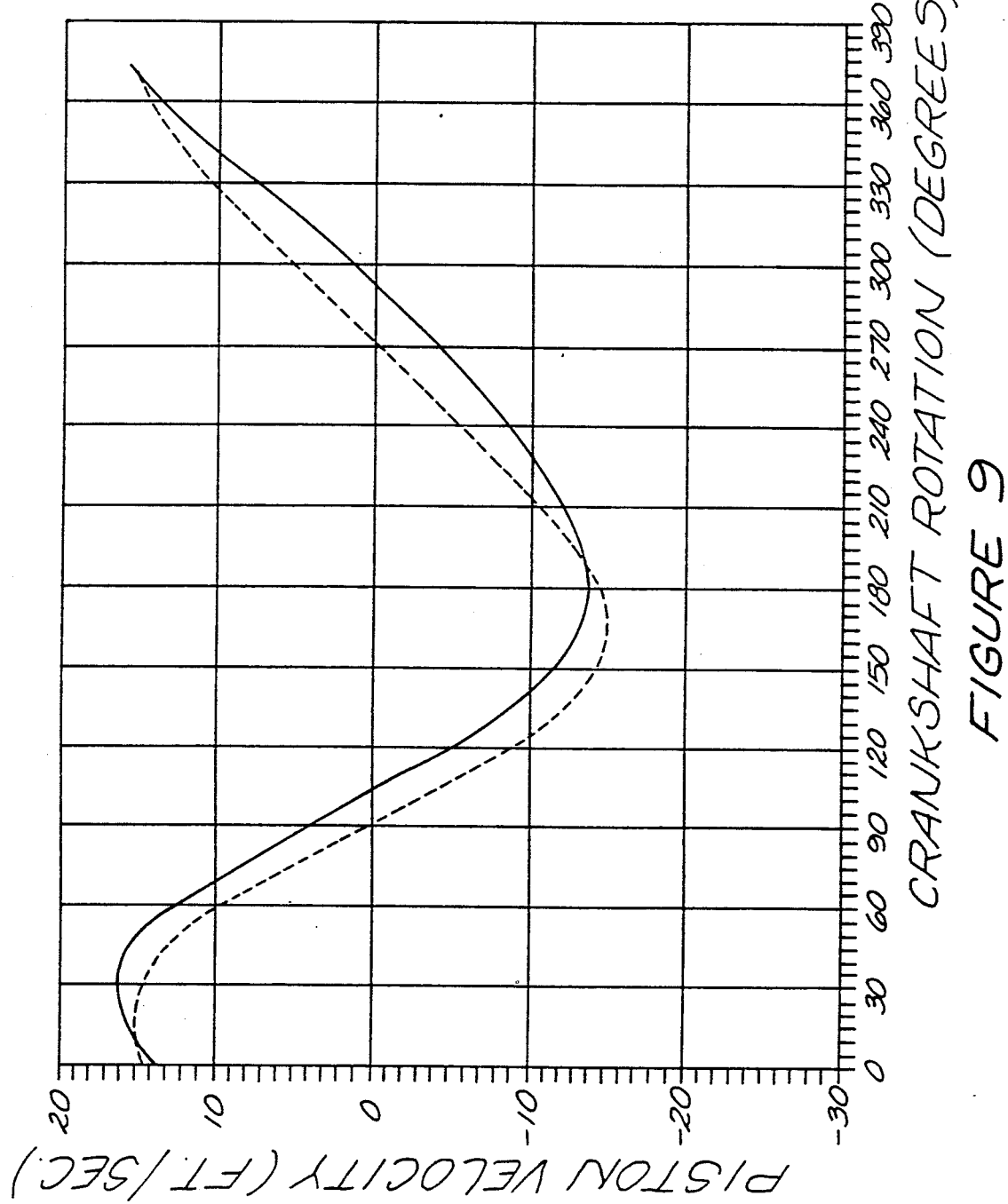
FIG. 9 is a graph of piston velocity vs. degrees of crankshaft rotation for a conventional engine with aligned piston and crankshaft and an engine with the offset relation of the piston and crankshaft in accordance with the present invention of the arrangement shown in FIGS. 3–6 where both engines have equal stroke.

In FIG. 9, piston velocity is graphed against crankshaft rotation for an engine with conventional crankshaft and for this invention where the crankshaft is offset by the length of the crank arm. It is seen that the maximum downward velocity occurs at about 165° for the conventional crankshaft arrangement and 180° for the offset crankshaft of this invention.

Figure 10:
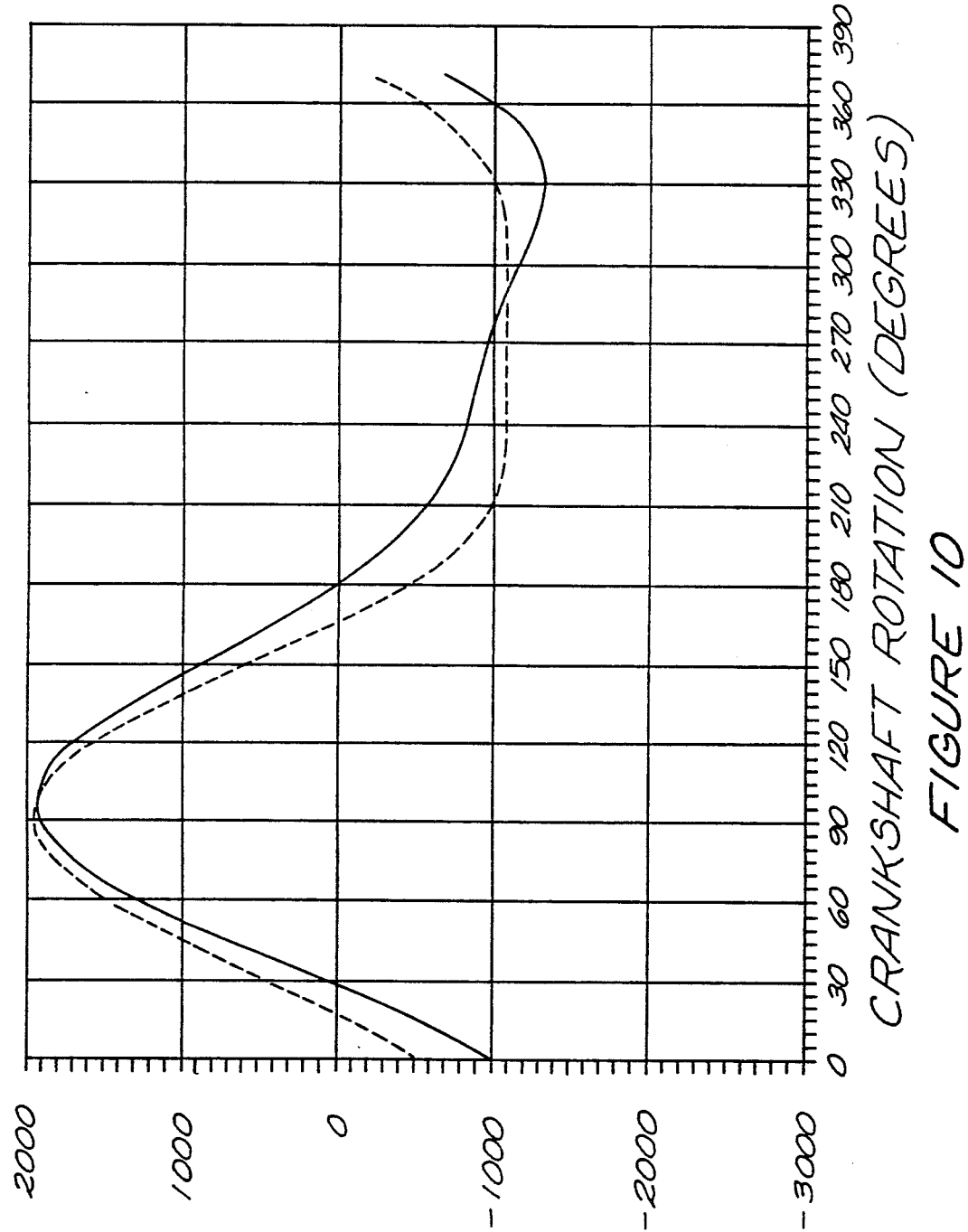
FIG. 10 is a graph of piston acceleration vs. degrees of crankshaft rotation for a conventional engine with aligned piston and crankshaft and an engine with the offset relation of the piston and crankshaft in accordance with the present invention of the arrangement shown in FIGS. 3–6 where both engines have equal stroke.

In FIG. 10, piston acceleration is graphed against crankshaft rotation for an engine with conventional crankshaft and for this invention where the crankshaft is offset. It is seen that the maximum acceleration is lower for the offset crankshaft than for the conventional crankshaft during the down stroke but higher on the upstroke.

Figure 11:
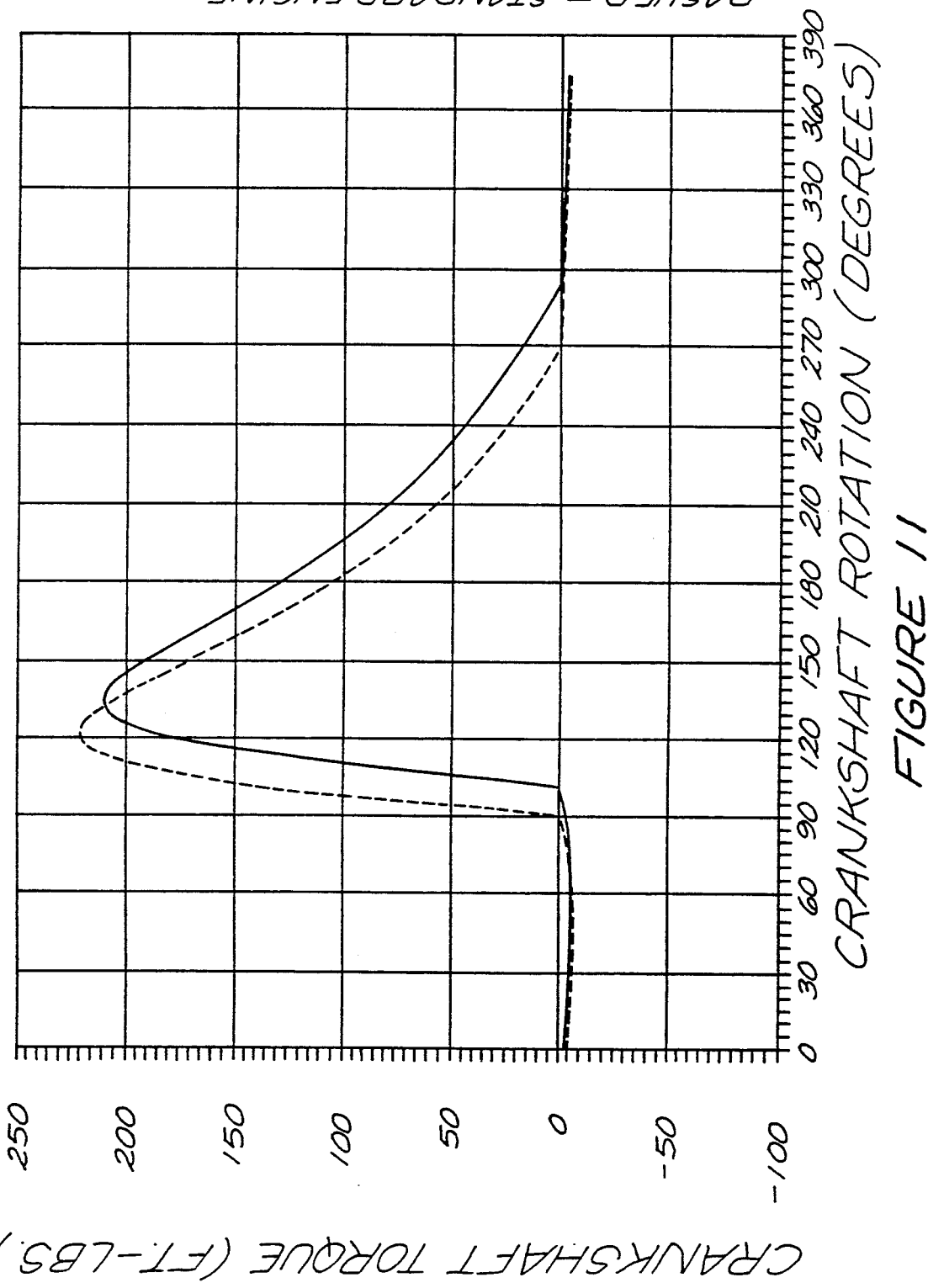
FIG. 11 is a graph of crankshaft torque vs. degrees of crankshaft rotation for a conventional engine with aligned piston and crankshaft and an engine with the offset relation of the piston and crankshaft in accordance with the present invention of the arrangement shown in FIGS. 3–6 where both engines have equal stroke.
Figure 12:
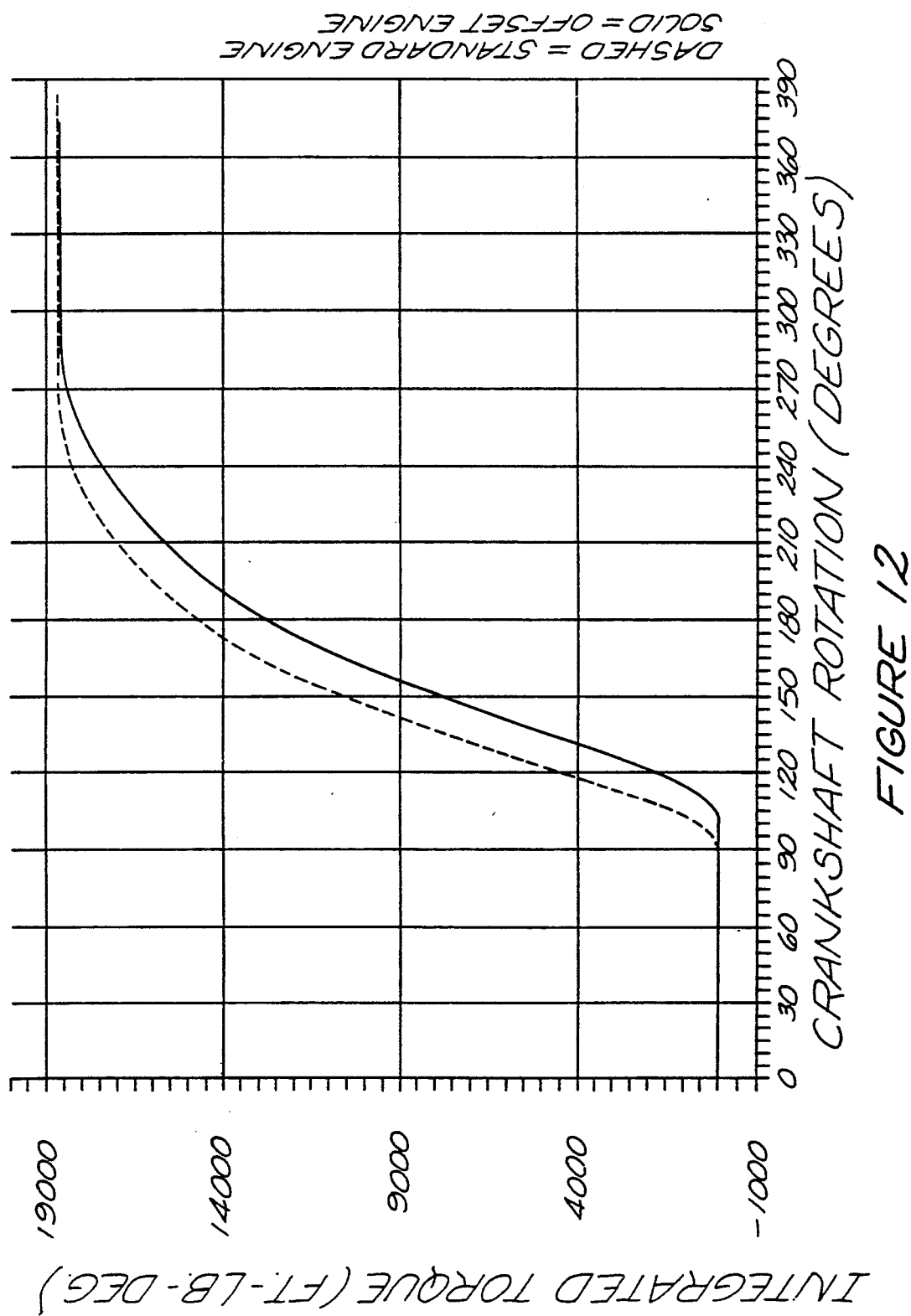
FIG. 12 is a graph of integrated torque vs. degrees of crankshaft rotation for a conventional engine with aligned piston and crankshaft and an engine with the offset relation of the piston and crankshaft in accordance with the present invention of the arrangement shown in FIGS. 3–6 where both engines have equal stroke.

In FIG. 11, crankshaft torque is graphed against crankshaft rotation for an engine with conventional crankshaft and for this invention where the crankshaft is offset by the length of the crank arm. It is seen that the maximum torque for the offset crankshaft occurs after and is lower than the maximum torque for the conventional crankshaft In FIG. 12, integrated crankshaft torque is graphed against crankshaft rotation for an engine with conventional crankshaft and for this invention where the crankshaft is offset by the length of the crank arm. It is seen that the maximum integrated torque for the offset crankshaft occurs after but is equal to the total integrated torque of the conventional engine, both engines having equal stroke.

While this invention has been described fully and completely with special emphasis upon a preferred embodiment, it should be understood that, within the scope of the appended claims, the invention may be practiced otherwise than as specifically described herein.

I claim:

1. An internal combustion engine having a cylinder, a single piston positioned for reciprocal movement in each said cylinder, fixed length connecting rod, and fixed crankshaft with crank arms in which
    said crankshaft is in a fixed position offset by about the length of the crank arm with respect to the vertical center line of said piston and cylinder whereby the downstroke of said piston rotates said crankshaft through more than 180° of rotation,
    said cylinder has a relieved section in the lower portion thereof allowing excess sidewise movement of said connecting rod, and
    the offset position of the crankshaft produces a lower maximum torque on the crankshaft.

2. An internal combustion engine according to claim 1 in which:
    said engine is a four cycle engine.

3. An internal combustion engine according to claim 1 in which:
    said engine is a two cycle engine.

4. An internal combustion engine according to claim 1 in which:
    said crankshaft is moved through about 190° on full downward movement of said piston.

5. An internal combustion engine according to claim 1 in which:
    the time of the piston down stroke is greater than the time of the piston upstroke which produces improved air/fuel intake to the engine.

6. An internal combustion engine according to claim 1 in which:
    the offset position of the crankshaft produces a lower maximum torque on the crankshaft.

7. An internal combustion engine according to claim 1 in which:
    the piston travel is greater than the diameter of crankshaft rotation.

8. An internal combustion engine according to claim 1 in which:
    said crankshaft is offset by about the length of the crank arm,
    said cylinder has a relieved section in the lower portion thereof allowing excess sidewise movement of said connecting rod, and
    said engine is a four cycle engine.

9. An internal combustion engine according to claim 1 in which:
    said crankshaft has a U-shaped crank arm,
    said cylinder has a slot in the lower portion thereof positioned to allow pivotal sidewise movement of said connecting rod,
    said piston is slidably positioned for reciprocal movement in said cylinder,
    said connecting rod is connected at its upper end to said piston and pinned inside said piston to allow said connecting rod to move pivotally side to side,
    said connecting rod is connected at its lower end to said U-shaped crank,
    combustion occurs in said cylinder, in the upper portion, forcing said piston to move downward,
    said piston downward movement causes said connecting rod to move downward, resulting in the lower end of said connecting rod moving to turn said U-shaped crank, and offset crankshaft, and
    the time of piston downward movement is greater than the time of piston upward movement 10. An internal combustion engine according to claim in which:
    said crankshaft has a U-shaped crank arm,
    said cylinder has a slot in the lower portion thereof positioned to allow pivotal sidewise movement of said connecting rod,
    said piston is slidably positioned for reciprocal movement in said cylinder,
    said connecting rod is connected at its upper end to said piston and pinned inside said piston to allow said connecting rod to move pivotally side to side,
    said connecting rod is connected at its lower end to said U-shaped crank,
    combustion occurs in said cylinder, in the upper portion, forcing said piston to move downward,
    said piston downward movement causes said connecting rod to move downward, resulting in the lower end of said connecting rod moving to turn said U-shaped crank, and offset crankshaft,
    the time of piston downward movement is greater than the time of piston upward movement, and
    the offset position of the crankshaft being operable produce a lower maximum torque on the crankshaft.

11. An internal combustion engine according to claim 1 in which:
    said engine is a four cycle engine,
    said crankshaft has a U-shaped crank arm,
    said cylinder has a slot in the lower portion thereof positioned to allow pivotal sidewise movement of said connecting rod,
    said piston is slidably positioned for reciprocal movement in said cylinder,
    said connecting rod is connected at its upper end to said piston and pinned inside said piston to allow said connecting rod to move pivotally side to side,
    said connecting rod is connected at its lower end to said U-shaped crank,
    combustion occurs in said cylinder, in the upper portion, forcing said piston to move downward,
    said piston downward movement causes said connecting rod to move downward, resulting in the lower end of said connecting rod moving to turn said U-shaped crank, and offset crankshaft,
    the time of piston downward movement is greater than the time of piston upward movement, and
    the offset position of the crankshaft being operable produce a lower maximum torque on the crankshaft.

* * * * *